US012627635B2

(12) United States Patent
Yadav et al.

(10) Patent No.: US 12,627,635 B2
(45) Date of Patent: May 12, 2026

(54) SYSTEM AND METHOD FOR AUTOMATIC DOCUMENT PROTECTION USING INFORMATION RIGHTS MANAGEMENT

(71) Applicant: Seclore Technology Pvt Ltd., Mumbai (IN)

(72) Inventors: Darashan Singh Yadav, Mumbai (IN); Hiranyakumar Anilkumar Patel, Mumbai (IN)

(73) Assignee: SECLORE TECHNOLOGY PVT LTD., Mumbai (IN)

( * ) Notice: Subject to any disclaimer, the term of this patent is extended or adjusted under 35 U.S.C. 154(b) by 263 days.

(21) Appl. No.: 17/657,352

(22) Filed: Mar. 30, 2022

(65) Prior Publication Data

US 2023/0319017 A1      Oct. 5, 2023

(51) Int. Cl.
*H04L 9/40*          (2022.01)
*G06F 21/62*          (2013.01)

(52) U.S. Cl.
CPC .......... *H04L 63/0281* (2013.01); *G06F 21/62* (2013.01); *G06F 21/6209* (2013.01); *H04L 63/168* (2013.01)

(58) Field of Classification Search
CPC ... H04L 63/0281; H04L 63/168; G06F 21/62; G06F 21/6209
See application file for complete search history.

(56) References Cited

U.S. PATENT DOCUMENTS

| | | | |
|---|---|---|---|
| 7,720,863 B2 | 5/2010 | Fifield et al. | |
| 7,913,309 B2 * | 3/2011 | Starostin | H04L 63/10 |
| | | | 380/278 |
| 9,288,184 B1 | 3/2016 | Kvamme et al. | |
| 10,592,683 B1 * | 3/2020 | Lim | H04L 63/20 |
| 2003/0208693 A1 | 11/2003 | Yoshida | |
| 2005/0138110 A1 * | 6/2005 | Redlich | G06F 21/6254 |
| | | | 709/201 |
| 2005/0149726 A1 | 7/2005 | Joshi et al. | |
| 2012/0047097 A1 | 2/2012 | Sengupta et al. | |
| 2012/0047162 A1 | 2/2012 | Guglietti et al. | |
| 2018/0096158 A1 * | 4/2018 | Murphy | G06F 21/6218 |
| 2023/0319017 A1 * | 10/2023 | Yadav | H04L 63/168 |
| | | | 726/12 |

FOREIGN PATENT DOCUMENTS

CA          2627534 A1 *    5/2007    ............. H04L 51/00

OTHER PUBLICATIONS

International Search Report, dated Jul. 20, 2023, for PCT/IN23/50317, International Filing Date Mar. 30, 2023, 14 pages.
First Examination Report for Indian Patent Application No. 202427073742, dated Jan. 23, 2026, 9 pgs.

* cited by examiner

*Primary Examiner* — Theodore C Parsons
(74) *Attorney, Agent, or Firm* — Kwan & Olynick LLP

(57)          ABSTRACT

System and method for automatically protecting sensitive information downloaded as documents from enterprise web applications using Information Rights Management. The system includes technologies capable of intercepting and modifying HTTP traffic, software/program to detect and extract the sensitive information out of the HTTP traffic, and an IRM Server. The HTTP request and response are inspected and any sensitive information found is extracted and protected using the IRM Server. The IRM protected version of the sensitive information is then sent to an HTTP client.

20 Claims, 5 Drawing Sheets

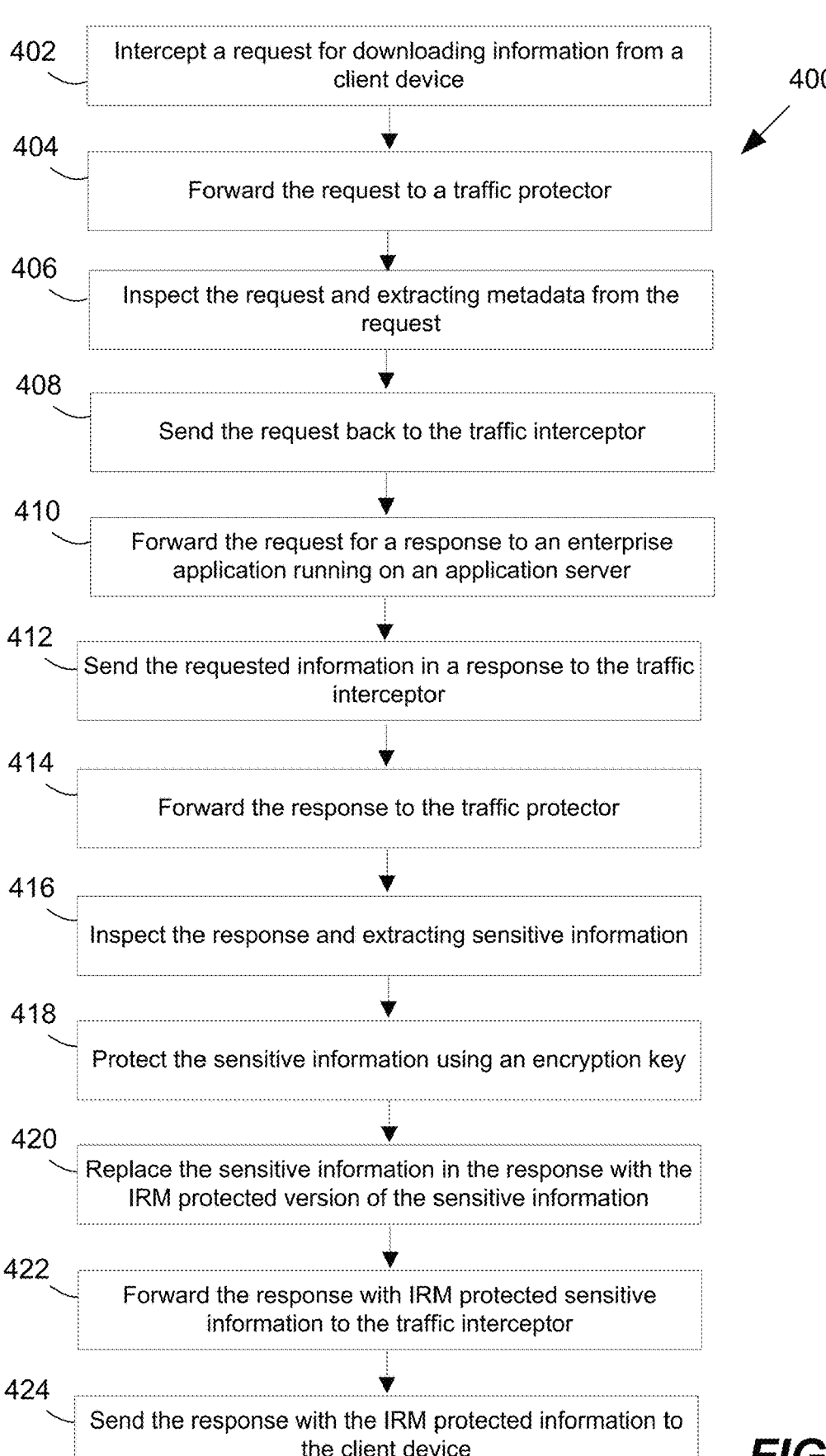

402   Intercept a request for downloading information from a client device

400

404   Forward the request to a traffic protector

406   Inspect the request and extracting metadata from the request

408   Send the request back to the traffic interceptor

410   Forward the request for a response to an enterprise application running on an application server 412   Send the requested information in a response to the traffic interceptor 414   Forward the response to the traffic protector 416   Inspect the response and extracting sensitive information 418   Protect the sensitive information using an encryption key 420   Replace the sensitive information in the response with the IRM protected version of the sensitive information 422   Forward the response with IRM protected sensitive information to the traffic interceptor 424   Send the response with the IRM protected information to the client device

FIG. 4

SYSTEM AND METHOD FOR AUTOMATIC DOCUMENT PROTECTION USING INFORMATION RIGHTS MANAGEMENT

TECHNICAL FIELD

The present disclosure relates to computer systems, and specifically to Information Rights Management of documents.

BACKGROUND

Almost all medium and large enterprises depend on transactional systems, such as line of business applications, for their day-to-day operations. Line of business applications are vital for running an enterprise. Lines of business applications are usually large programs that contain a number of integrated capabilities and tie into storage systems. These applications collect and/or generate large amount of sensitive information and allow a user of these applications to extract sensitive information in the form of documents. The sensitive information stored/generated by the applications should be protected from the unauthorized access once extracted from the application. Information access within the application is usually controlled via access rights logic to ensure that users access only information they are authorized to access.

However, the information extracted or downloaded from an application is no longer controlled by that application. The information may have been downloaded by the authorized user but can be shared with anybody without any limitations once it is outside the application. Thus, all information downloaded from applications is a potential source of information leakage. Access rights logic within the application may be sufficient to protect the information when it is accessed within the boundaries of the application, but it cannot control the information once it is extracted outside the application. Information Rights Management (IRM) can be integrated with the application to protect the information being downloaded or extracted before it is made available to the authorized user. However, the integration of the IRM with enterprise applications poses some challenges to enterprises. For example, IRM integration usually requires modification of source code of the enterprise application. These modifications are often time consuming and cost intensive and require skilled human resources. In addition, source code for enterprise applications is not always publicly available. Consequently, IRM integration into enterprise applications is often times not feasible from commercial standpoint. Thus, there is a need for system that can apply IRM protections to documents downloaded from enterprise applications without the need to integrate the IRM with the enterprise applications themselves.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a method, system, and computer readable medium storing instructions for automatically protecting documents using Information Rights Management (IRM). The method begins with intercepting, via traffic interceptor, a request for downloading information from a client device. Next, the method includes forwarding, via the traffic interceptor, the request to a traffic protector. Then, the method includes inspecting, via the traffic protector, the request and extracting metadata from the request. Next, the method includes sending, via the traffic protector, the request back to the traffic interceptor. The method also includes forwarding, via the traffic interceptor, the request for a response to an enterprise application running on an application server. Then, the method includes sending, via the enterprise application, the requested information in a response to the traffic interceptor. The method then includes forwarding, via the traffic interceptor, the response to the traffic protector. Next, the method includes inspecting, via the traffic protector, the response and extracting sensitive information. After, the method includes protecting, via the traffic protector, the sensitive information using an encryption key. The method also includes replacing the sensitive information in the response with the IRM protected version of the sensitive information. Then, the method includes forwarding the response with IRM protected sensitive information to the traffic interceptor. Last, the method includes sending the response with the IRM protected information to the client device.

In some embodiments, protecting the sensitive information includes determining what permissions are to be applied to the protected sensitive information. In some embodiments, the HTTP traffic includes an HTTP request from a client device. In some embodiments, the sensitive information is in a document downloaded from an enterprise application running an HTTP protocol. In some embodiments, the traffic interceptor is installed between an application server running the enterprise application and a client device in order to intercept HTTP requests and modify HTTP responses between the application server and client device. In some embodiments, the traffic protector is connected to the traffic interceptor in order to inspect and detect sensitive information in an HTTP response forwarded by the traffic interceptor. In some embodiments, the IRM server is connected to the traffic protector.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular embodiments of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

FIG. 4 shows a flow chart of an example method, in accordance with embodiments of the present disclosure.

DETAILED DESCRIPTION

Figure 1:
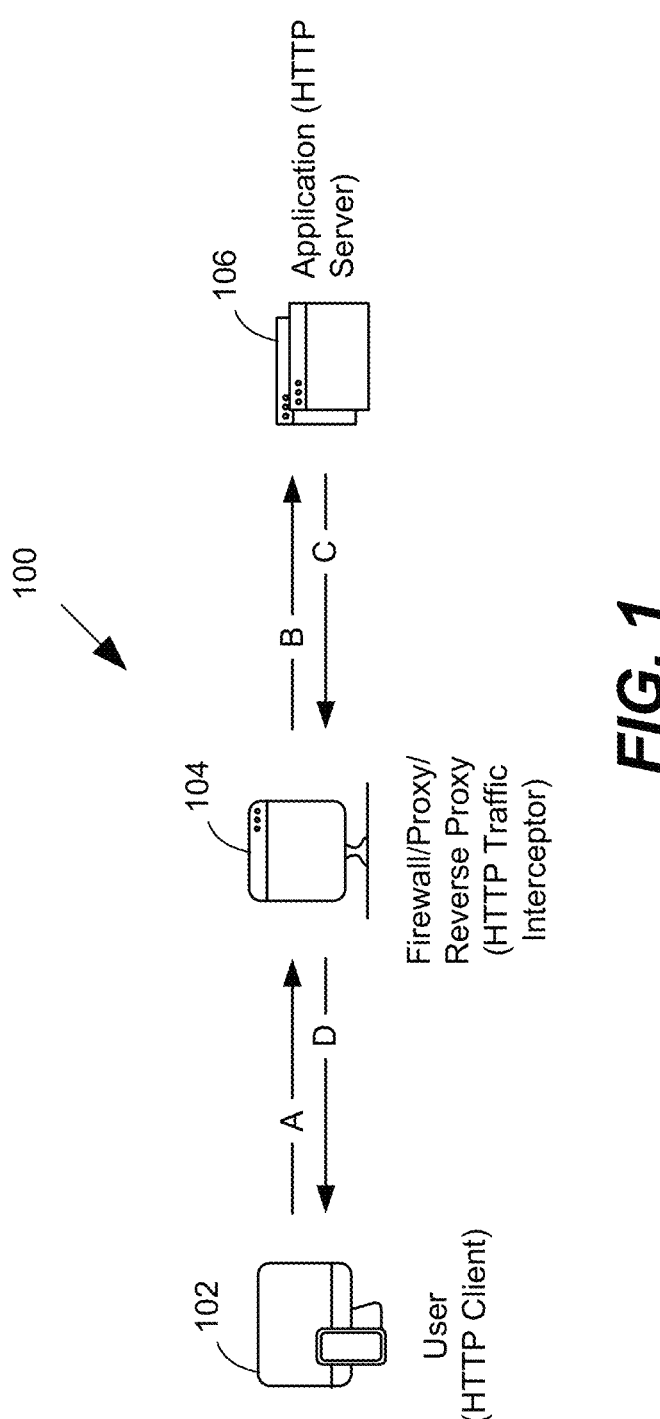
FIG. 1 shows a flow chart of an example network traffic flow, in accordance with embodiments of the present disclosure.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of biometric monitoring and education analysis optimization. However, it should be noted that the techniques of the present disclosure apply to a wide variety of network transactions, collaborative environments, data structures, and different types of data. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As used herein, the expression "Information Rights Management," or "IRM," or "Rights Management System," refers to, but is not limited to, a form of security technology used to protect documents and emails containing sensitive information from unauthorized access. IRM applies to all kinds of files and emails and unstructured information stored in file such as documents, spreadsheets, and presentations. IRM protects files from unauthorized access or usage like viewing, editing, printing files or emails, capturing screenshot of files and emails, copying information from files and emails. It protects files when they are stored (at rest), are transmitted (in motion) and are used (in use).

As used herein, the expression "enterprise application" or "application" refers to, but is not limited to, an application used by enterprises, third-party or in-house application, managed and controlled directly or indirectly by an enterprise.

As used herein, the expression "legacy application" refers to, but is not limited to, an application that is outdated or obsolete.

As used herein, the expression "third-party application" refers to, but is not limited to, an application that is provided or developed by a vendor other than the enterprise or the IRM provider.

As used herein, the expression "permissions" refers to, but is not limited to, instruction given by the owner of a document to the Information Rights Management system to indicate that a specific user has access to that protected document and what actions that user can perform on that document i.e. read, edit, print, copy data, screen capture etc., when can perform and where can perform.

As used herein, the expression "network equipment" refers to software or hardware, capable to intercept and modify the network traffic between network clients and network applications.

As used herein, the expression "reverse proxy server" refers to a type of proxy server that retrieves resources on behalf of a client from one or more servers or applications.

As used herein, the expression "firewall" refers to a network security software or hardware, capable to monitor, filter and control incoming and outgoing network traffic. Similarly, as used herein, the expression "web application firewall" refers to a category of firewall that monitors, filters or blocks data packets as they travel to and from a website or web application.

As used herein, the expression "Data Loss Prevention," or "DLP," is a software that monitors and detects the sensitive data and prevents the leakage of the data outside the enterprise.

As used herein, the expression "Enterprise Resource Planning," or "ERP," refers to a type of software that organizations use to manage day-to-day business activities such as accounting, procurement, project management, risk management and compliance, and supply chain operations.

As used herein, the expression "Customer Relationship Management," or "CRM," refers to a type of software that organizations use for interactions with their customers. CRMs typically use data analysis to study large amounts of information.

As used herein, the expression "Human Resources Management System," "HRMS," is a form of human resources software that combines several systems and processes to ensure the easy management of human resources, business processes and data.

As used herein, the expression "necessary metadata," or "necessary information," refers to the information from the HTTP request or HTTP response to identify the user's identity, IP address, type of information the user is trying to download, size of the information or data, name of the file downloaded. In some embodiments, this information is part of HTTP headers, query parameters and cookies in HTTP requests and HTTP responses. According to various embodiments, the above information is required to IRM protect files with proper permission and create them in a correct format.

As used herein, the expression "sensitive information" refers to the data that must be protected from unauthorized access to safeguard the privacy or security of an individual or organization. This information can be identified by existing systems, like DLP, either by configuring various rules or other methods provided by such systems.

As previously mentioned, almost all medium and large enterprises depend on transactional systems, such as line of business applications, for their day-to-day operations, e.g., Enterprise Resource Planning (ERP), Customer Relationship Management (CRM), Human Resources Management System (HRMS), order management, invoicing, accounting, planning and control, transport and logistics, etc. These lines of business applications are vital to run an enterprise and are usually large programs that contain a number of integrated capabilities and tie into storage systems. These applications collect and/ or generate large amount of sensitive information and allow a user of these applications to extract sensitive information in the form of documents. The sensitive information stored/generated by the applications should be protected from the unauthorized access once extracted from the application. Information access within the application is usually controlled via access rights logic to ensure that users access only information they are authorized to access.

However, once information is extracted or downloaded from an application, it is no longer controlled by that application. The information may have been downloaded by the authorized user but can be shared with anybody without any limitations once it is outside the application. Thus, all information downloaded from applications is a potential source of information leakage. Access rights logic within the application may be sufficient to protect the information when it is accessed within the boundaries of the application, but it cannot control the information once it is extracted outside the application. Information Rights Management (IRM) can be integrated with the application to protect the information being downloaded or extracted before it is made available to the authorized user. However, the integration of IRM with enterprise applications poses some challenges to enterprises.

One approach for IRM integration into an enterprise application is to make changes in the source code of the application itself such that whenever sensitive information is downloaded from the application, it is first IRM protected and then downloaded for the user. However, this approach is made difficult by the following factors: 1) the source code of the enterprise application is usually not available for modification if the application is a legacy application or third-party application; 2) modifications required in applications for IRM integration costs time and effort, which often times makes IRM integration commercially unviable; 3) most enterprise applications are not integration friendly, or do not provide any way to plug in an IRM without changing the core working code of the application; 4) integration of IRM technology with enterprise applications is challenging in the absence of specific expertise. These challenges make integrating IRM protection into enterprise applications quite difficult.

In short, at present, to protect to the sensitive information downloaded as documents from the enterprise applications using IRM, modification in the source code of the application is needed. These modifications are time consuming, cost intensive, and require skilled human resources. In cases where modifying an application is not feasible, companies have often resorted to changing workflow to introduce manual intervention to protect sensitive information. In addition, even if IRM integration is feasible, each application needs to be modified separately. Taking into consideration all these challenges, the techniques and mechanisms of the present disclosure offer a unique approach to IRM protection of sensitive information by extracting sensitive information from enterprise applications as documents, and then subsequently applying IRM protection without the need to make changes to the source code of the application or to existing workflows.

The present disclosure describes a method to automatically IRM protect the sensitive information downloaded as documents from enterprise applications which are web-based applications running on HTTP/HTTPS protocol, without making any modification in the source code of the application. The present disclosure discloses a method that enables the interception to inspect HTTP request and HTTP response exchanged between the HTTP client and HTTP/Web application, detect any sensitive information being downloaded and replace it with IRM protected version before it is sent to HTTP client. There are many software programs available for the interception of the HTTP traffic i.e. HTTP request and the HTTP response exchanged between the HTTP client and HTTP/Web application, such as ICAP supporting Network Equipment like Firewalls, Reverse Proxy Servers like Apache and SQUID and Web Application Firewalls. These software programs also allow inspection and modification of the request and response on the way. Using these software programs, request and response is inspected to detect that sensitive information being downloaded from the application. This sensitive information is then extracted from the response and the response is modified to replace the sensitive information with its IRM protected version.

According to various embodiments, the request from the HTTP Client is intercepted by the HTTP Traffic Interceptor software before it reaches the application. This request is sent to IRM Protection software for inspection. The HTTP Traffic Protector software inspects the request and extracts necessary metadata and sends the request back to HTTP Traffic Interceptor. The request is forwarded to the Application. The HTTP response sent by the Application is intercepted by the HTTP Traffic Interceptor before it reaches the HTTP Client. The response is again sent to the HTTP Traffic Protector to detect and extract the sensitive information being downloaded. The HTTP Traffic Protector then IRM protects the sensitive information with the help of the IRM server. The sensitive information in the response is replaced with the IRM protected version of the information. The response with IRM protected information is sent to the HTTP Traffic Inspector. The HTTP Traffic Inspector sends the response to the HTTP Client. The HTTP Client then downloads IRM protected information for the user as file. ICAP supporting Network Equipment like Firewalls, Reverse Proxy Servers like Apache and SQUID and Web Application Firewalls are few examples of HTTP Traffic Interceptor software. ICAP Server, Apache Filter and SQUID eCAP Plugin with IRM protection capability are few examples of HTTP Traffic Protector.

According to various embodiments, the techniques and mechanisms of the present disclosure provide for HTTP Traffic Protector software that integrates with the HTTP Traffic Interceptor to automatically protect documents downloaded from the Enterprise Application. In some embodiments, this can be implemented in three parts.

First, the system identifies that user is downloading a document which contains sensitive information. This can be achieved in different ways. One way is for the document that gets downloaded to be a response to a HTTP request. By inspecting the requested URL and other information associated with the HTTP request, one can determine if the response is sensitive. This could include URL pattern, request parameters, etc. For example, a URL Pattern can be: URL "https://mis.acme.com/reports/24" may match a URL pattern defined like "*://mis.acme.com/reports/24". This can be understood as report 24 being downloaded from the MIS system. In another example, the Request Parameter can be: Request Parameter : Request "https://mis.acme.com/reports?reportid=24" may match URL pattern "*://mis.acme.com/reports" and request parameter "reported" provides which exact report is being downloaded. URL pattern along with request parameter suggesting that report id 24 is being downloaded. In another example, a rule or configuration can be defined in the HTTP Protector software suggesting a specific URL pattern or a combination of URL pattern and request parameter needs to be protected.

According to various embodiments, another way to identify sensitive information is to call other third party tools that inspect document content to determine if it contains sensitive information. These tools can be categorized as Content Inspection Tools, e.g., Data Loss Prevention software, Data Discovery software, etc. Content Inspection tools provide APIs that can be called to submit a document for inspection where it returns the sensitivity of the information. For example, Content Inspection tools can be configured with their own rules to look for certain keywords or patterns like credit card information or social security number inside the document content. It can be configured to return the sensitivity as high if such content is found inside the document. In some embodiments, this sensitivity can be used by HTTP Traffic Protector software to decide if this document needs to be protected before download.

Second, the system encrypts and protects the document using Information Rights Management. According to various embodiments, this is achieved by calling API provided by the Information Rights Management solution to encrypt and protect the document. Typically, the HTTP Traffic Protector software will call the PROTECT API of the API interface provided by the IRM system to protect the document.

Third, the system decides what permissions should be applied to the document. When the document gets protected with Information Rights Management, only authorized users are allowed to access the information. Unless a user is allowed access, he/she cannot access the downloaded document. This can be achieved by inspecting the HTTP request or based on the sensitivity returned by the Content Inspection system. This may include URL patterns or request parameters associated with the HTTP request. According to various embodiments, there are several approaches to define what permissions are to be applied to the protected document.

According to various embodiments, one way may be to associate a pre-defined IRM policy with the type of document determined based on the URL Pattern or HTTP request parameters. For example, the system can identify that report id 24 is getting downloaded and associate a predefined IRM policy id 37 (say) with it. In some embodiments, an IRM Policy is a set of permissions for different users or group of users. For example:

Jack Nicolson View+Print
Ana Thompson View+Edit+Print
Linda Jones Full Control

In some embodiments, such IRM Policies can be defined within the Information Rights Management system. Each such policy may be given an IRM Policy Id. This IRM Policy Id can be mapped to the URL Pattern or request parameter. In some embodiments, the PROTECT API provided by the IRM system can be passed the IRM Policy Id while protecting the document.

According to various embodiments, another way may be to determine the user who is downloading the information based on HTTP request parameters and only allow that specific user to access the IRM protected document. For example, when a URL pattern is "*://mis.acme.com/reports/24," the system can protect the document downloaded by only allowing the downloading user to access the document. Another example could be if the Content Inspection tool returns sensitivity of the document as highly sensitive, which will only allow the downloading user to access the document. In some embodiments, such specific permissions can be passed to the PROTECT API provided Information Rights Management system at the time of protecting the document.

Yet another way may be to federate IRM permissions with the HTTP Application such that all users who are allowed to access that document or information within the HTTP Application are allowed to access the downloaded report. For example, in the MIS application, report id 24 can be accessed by user A, user B, and group C. The IRM system can federate these permissions in real time from the HTTP Application at the time of user accessing the downloaded report such that only user A, user B and users from group C are allowed to open and view the downloaded document.

In some embodiments, the IRM agent communicates with the IRM server when any user is trying to access the document to query for user's permissions on the document. The IRM server has the information that the document is downloaded from HTTP Application and metadata associated with the document, e.g., Report Id 24. The IRM server in-turn reaches out to the HTTP Application to fetch permissions of the user on the document. For this the HTTP Application needs to have an interface which the IRM server can query to fetch user's permissions by passing metadata associated with the document. The HTTP Application returns the permissions of the user on the document. These permissions are then returned by the IRM server to the IRM agent. IRM agent then opens the document for the user as per the permissions returned by the IRM server.

FIG. 1 illustrates an example process flow without IRM protection. Arrow A in FIG. 1 shows an HTTP request, sent by HTTP Client (the user) 102, to download a file from application 106, which is an HTTP Server application. In some embodiments, Traffic Interceptor (Firewall) 104 is installed in front of application 106 and receives the request instead of the application. Arrow B in FIG. 1 shows that the request is forwarded to Application 106 by Firewall 104. Arrow C in FIG. 1 shows that the response is generated by Application 106 after processing the request. The response, which includes the file, is sent back to Firewall 104 instead of HTTP Client 102. Last, arrow D in FIG. 1 shows that the response is sent to client 102. In some embodiments, client 102 downloads the file for the user.

In some embodiments, system 100 is implemented using a proxy server, also known as a forward proxy server, as the Http traffic interceptor, e.g., a Squid proxy server. A proxy server, sometimes referred to as a forward proxy, is a server that routes traffic between client(s) and another system, usually external to the network. In some embodiments, this approach is usually effective when the HTTP Application is hosted on third party cloud and the enterprise cannot or does not want to change infrastructure on the HTTP Application side. The enterprise can route all the traffic to the HTTP Application from its users via a Proxy Server, which can act as HTTP Interceptor. When running as a generic proxy server, like Squid, the proxy server needs the address of the device it will be running on and the port on which it will accept traffic. These can be configured in a configuration file, e.g., a squid.cof file of the proxy server, which resides at etc/squid/squid.conf. In some embodiments, the end user machines, which will act as Http clients, need to be configured to route the web traffic using the above proxy. These proxy settings can be configured in browser of end user's machine.

Figure 2:
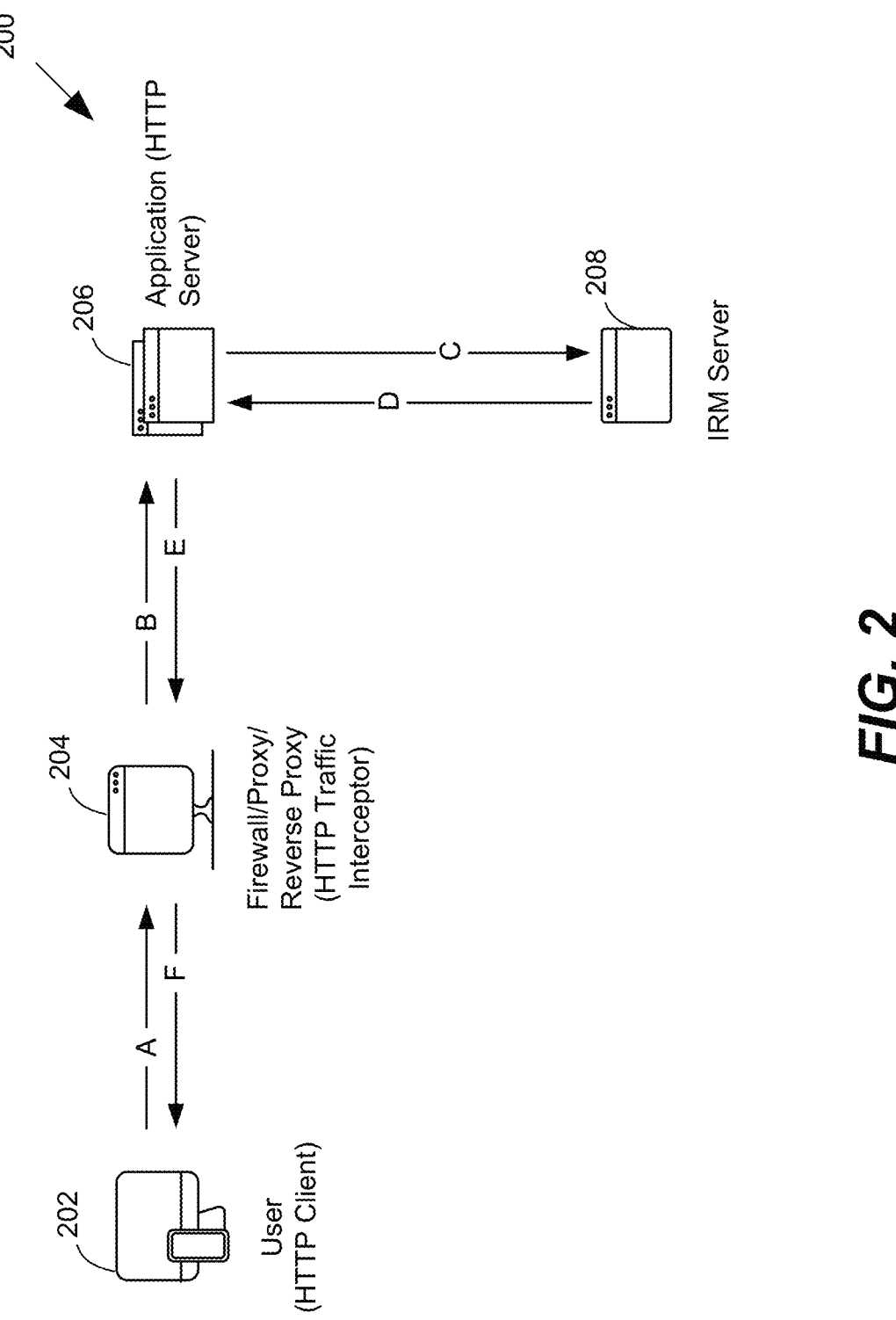
FIG. 2 shows a flow chart of another example network traffic flow, in accordance with embodiments of the present disclosure.

FIG. 2 illustrates an example process flow with IRM protection. Arrow A in FIG. 2 shows an HTTP request, sent by HTTP Client (the user) 202, to download a file from application 206, which is an HTTP Server application. In some embodiments, Traffic Interceptor (Firewall) 204 is installed in front of application 206 and receives the request instead of the application. Arrow B in FIG. 2 shows the HTTP request being sent to Application 206 with IRM protection capability for inspection and/or modification. In some embodiments, this includes modifying the application to enable IRM protection. In some embodiments, Application 206 inspects the response to detect the presence of any information that needs IRM protection. Any such sensitive information and other metadata (e.g., file name, file extension file format content size encoding, etc.) from the response is extracted by Application 206. If the response does not contain the sensitive information, then Application 206 sends back the response as is to Firewall 204. Arrow G in FIG. 2 shows that Application 206 fetches an encryption key from IRM Server 208 to encrypt the information. In some embodiments, Application 206 also specifies the IRM Policy to be applied to the file being downloaded to grant permissions to authorized users only. Arrow D in FIG. 2 shows that the encryption key is sent by IRM server 208 to Application 206. Arrow E in FIG. 2 shows that the response with IRM protected sensitive information is sent to Firewall 204. In some embodiments, Application 206 applies IRM protection to the sensitive information and encrypts it using the encryption key fetched from IRM Server 208. In some embodiments, Application 206 replaces the sensitive information in the response with IRM protected version of the sensitive information. In some embodiments, Application 206 also modifies some headers, e.g., Content Size, File Name, File Extension and File Format, if required. Last, arrow F in FIG. 2 shows that the response that contains the IRM protected sensitive information is sent to client 202. In some embodiments, client 202 downloads the IRM protected sensitive information as a file for the user.

In some embodiments, system 200 is implemented using a reverse proxy server like Squid as the Http traffic inspector. A reverse proxy server is typically configured on the Application side. It sits in front of an Application and processes all the traffic that goes to the Application. All HTTP requests are first sent to the reverse proxy server which in turn can forward them to one or more servers where Application is running, get the response from those servers and send that response back to the requester. This approach is useful in cases where the enterprise can modify the infrastructure on the HTTP Application side. It can configure the reverse proxy server to process all requests going to the HTTP Application. These can originate from any users or devices. When running as reverse proxy server like Squid, the following configuration needs to be placed in a config file, like squid.cof file, of the proxy server, which resides at etc/squid/squid.conf. The following is an example instruction that can be used:

```
cache_peer app50.stringsend.com parent 443 0 no-query originserver ssl
sslflags=DONT_VERIFY_PEER login=PASS connection-auth=off
name=app
https_port 443 cert=/cert/domain.crt key=/cesrt/domain.key accel
defaultsite=stringsend.com vhost
```

The DNS entry for stringsend.com, which is an application server, needs to be updated such that all the request for stringsend.com are passed to the reverse proxy server first. In an example configuration of IRM ICAP server to run on IP address 192.168.34.102 and port 1344, for proxy the system needs to configure the following details in squid.conf file:

```
icap_enable on
icap_preview_enable off
icap_persistent_connections off
icap_send_client_ip on
icap_send_client_username on
icap_service service_resp respmod_precache bypass=1
icap://192.168.34.102:1344/irmprotector
adaptation_access service_resp allow all
```

In the example above, the configuration is done such a way that it can handle the response received from HTTP application server.

As mentioned above, enterprises use many Line of Business applications, both legacy and modern. ERP applications (e.g., SAP), core banking applications, HRMS, and analytic tools (e.g., SAS), are few examples of such applications. These applications collect and/generate bulk of sensitive information. Also, these applications allow users to extract or download information in the form of reports or information dump for offline use. The information extracted from these applications requires protection from unauthorized access. In many cases, this requires modifying applications in such a way that whenever sensitive information is downloaded from the application, it is first IRM protected and then downloaded for the user.

Various embodiments in the present disclosure particularly focus on web applications accessed over HTTP/HTTPS protocol. Any web application which is hosted and managed by an organization, directly or indirectly, can be covered using the methods disclosed herein. There are many techniques and technologies available which allow intercepting the HTTP traffic (HTTP request and HTTP response exchanged between the client and the application). In the present disclosure these techniques and technologies are used to detect whether sensitive information is being asked in the HTTP request and modify the HTTP response to replace it with an IRM protected version of the sensitive information.

According to various embodiments, the techniques and technologies used to intercept the HTTP traffic are selected from but not limited to ICAP supporting Network Equipment like Firewall, Reverse Proxy Server like Apache and SQUID, and Web Application etc.

Several different mechanisms can be used to identify sensitive information being extracted/downloaded from web applications. In some embodiments, various metadata can be used to identify sensitive information like request URL, requesting user etc. In some embodiments, the information itself can be inspected to detect whether it is sensitive or not.

In some embodiments, content inspection applications like Data Loss Prevention (DLP) can be used to inspect the content for sensitive information. Whenever, sensitive information is identified using any of these techniques, that information can be protected with IRM.

According to various embodiments, an IRM Policy, which controls access of the IRM protected information can be defined when information is IRM protected. Also, the IRM Policy can be determined based on the HTTP request like URL pattern, HTTP request parameters, etc. In some embodiments, it can also be federated from the application if the application already has the feature to authorize access to the information stored in the application. Users who have access to this document, or information inside the application, are allowed to access the downloaded report.

Figure 3:
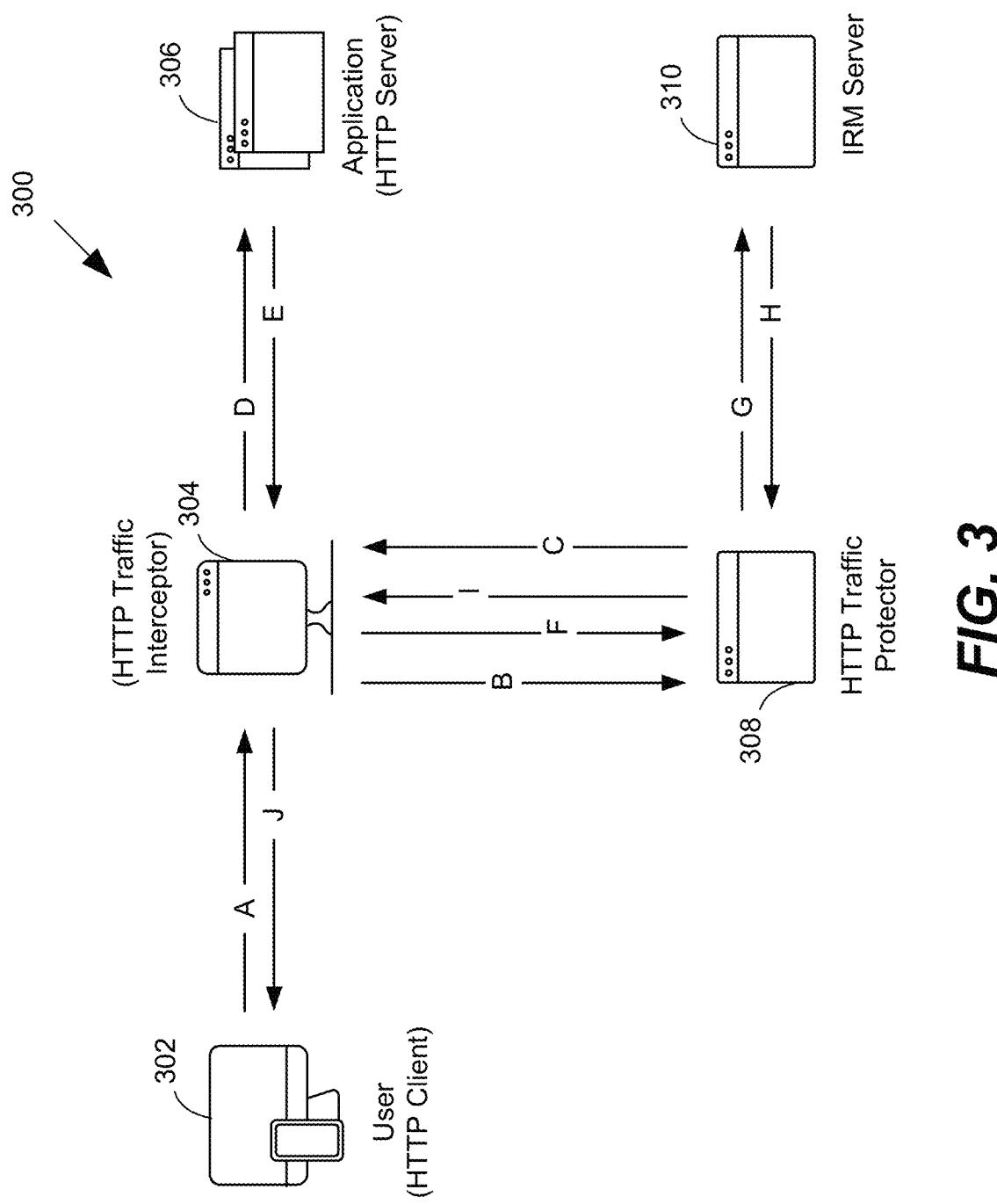
FIG. 3 shows a flow chart of yet another example network traffic flow, in accordance with embodiments of the present disclosure.

In some embodiments, the system comprises a Firewall capable of intercepting HTTP traffic and forwarding HTTP traffic to an ICAP server for inspection and modification (FIG. 3). Most of the Firewalls have capability to forward HTTP traffic to ICAP server(s) for inspection and modification (or adaptation). HTTP traffic can be forwarded to an ICAP Server which extracts the sensitive information from the response and replaces it with IRM protected version of the sensitive information. This way, the sensitive information downloaded from the application is IRM protected before it reaches the user.

This requires configuring an existing ICAP aware Firewall to forward the HTTP traffic to IRM ICAP Server which protects the information being downloaded. Once this configuration is done, whenever user downloads the sensitive information from the application, the information is IRM protected by the IRM ICAP Server before it is downloaded for the user.

The detailed flow of the HTTP Request (request) and the HTTP Response (response) which carries out the User's request to download the sensitive information as a document from the application and necessary processing required at each stage is as per the drawing (FIG. 3) wherein the relevant arrows indicating the flow are highlighted to indicate the step in the entire processing. The arrow heads are labeled in the alphabetical order.

Arrow A in FIG. 3 shows an HTTP request, sent by HTTP Client (the user) 302, to download the sensitive information from application 306, which is an HTTP Server application. In some embodiments, Traffic Interceptor (Firewall) 304 is installed in front of the application and receives the request instead of the application. Arrow B in FIG. 3 shows the HTTP request being sent to Traffic Protector (ICAP Server) 308 with IRM protection capability (IRM ICAP Server) for inspection and/or modification. Arrow C in FIG. 3 shows that the HTTP request, after inspection by the IRM ICAP Server 308 to extract necessary metadata (e.g., Application URL, File URL, and requesting the User's Identity and other HTTP headers, if required) is sent back to the Firewall 304. Arrow D in FIG. 3 shows that the request is forwarded to Application 306 by Firewall 304. Arrow E in FIG. 3 shows that the response is generated by Application 306 after processing the request. The response, with the requested sensitive information, is sent back to Firewall 304 instead of HTTP Client 302. Arrow F in FIG. 3 shows that the response with the sensitive information is sent to IRM ICAP Server 308 by Firewall 304 for modification. In some embodiments, IRM ICAP server 308 inspects the response to detect the presence of any information that needs IRM protection. Any such sensitive information and other metadata (e.g., file name, file extension file format content size encoding, etc.) from the response is extracted by IRM ICAP Server 308. If the response does not contain the sensitive information, then IRM ICAP Server 308 sends back the response as is to Firewall 304. Arrow G in FIG. 3 shows that IRM ICAP Server 308 fetches an encryption key from IRM Server 310 to encrypt the information. In some embodiments, IRM ICAP Server 308 also specifies the IRM Policy to be applied to the file being downloaded to grant permissions to authorized users only. Arrow H in FIG. 3 shows that the encryption key is sent by IRM server 310 to IRM ICAP Server 308. Arrow I in FIG. 3 shows that the response with IRM protected sensitive information is sent to Firewall 304. In some embodiments, IRM ICAP Server 308 applies IRM protection to the sensitive information and encrypts it using the encryption key fetched from IRM Server 310. In some embodiments, IRM ICAP Server 308 replaces the sensitive information in the response with IRM protected version of the sensitive information. In some embodiments, IRM ICAP Server 308 also modifies some headers, e.g., Content Size, File Name, File Extension and File Format, if required. Last, arrow J in FIG. 3 shows that the response that contains the IRM protected sensitive information is sent to client 302. In some embodiments, client 302 downloads the IRM protected sensitive information as a file for the user.

In some embodiments, a SQUID Reverse Proxy Server 304 and eCAP plugin 308 are used in place of Firewall 304 and ICAP IRM Server 308, respectively. In such embodiments, the difference here is that eCAP plugin 308 is responsible to inspect and modify the request and response and IRM protect the information.

In some embodiments, an Apache Reverse Proxy Server 304 and Apache Filter 308 are used in place of Firewall 304 and ICAP IRM Server 308, respectively. In such embodiments, Apache Filter 308 is responsible to inspect and modify the request and response and IRM protect the information.

In some embodiments, Web Application Firewall 304 and Web Gateway 308 are used to inspect and modify the request and response and IRM protect the information. It can either call external ICAP services, which do this job, or it may have some other internal mechanism to modify the request/ response.

In some embodiments, system 300 is implemented using another reverse proxy, like Apache server, as the Http traffic inspector, and a custom apache filter module configured as the HTTP Traffic Protector. In some embodiments, the HTTP traffic protector is a dynamic library that is plugged in apache using filter modules framework provided by an apache server. The DNS entry for stringsend.com, which is an application server, needs to be updated such that all the requests for stringsend.com are passed to the reverse proxy server first. The following is an example instruction that can be used to configure the module place, by add the following line in httpd.cong:

LoadModule ext_filter_module modules/HTTPPtotector.dll

An example instruction to configure the filter module involves creating the vhost file. A sample vhost file is:

Sample vhost configuration file for stringsend.com with the filter can as
```
<VirtualHost *:80>
ServerName stringsend.com
ProxyPass / balancer://balservers/
ProxyPassReverse / balancer://balservers
<Proxy balancer://balservers>
    # Reverse Proxy
    BalancerMember http://trac.seclore.com ttl=1200 smax=5
    ProxySet lbmethod=byrequests
```

-continued

```
</Proxy>
    ExtFilterDefine c-to-html mode=output \
    intype=application/pdf outtype=application/pdf \
    cmd="random"
    SetOutputFilter INFLATE;c-to-html;DEFLATE
    AddType application/pdf .pdf
  </VirtualHost>
```

In the above example, the configuration is done to intercept pdf files only as of now but the same can be extended for other file formats as well.

The HTTP traffic protector, on receiving the response, will analyze the response header to check whether the response contains a document as part of it. If the response contains a document the HTTP Protector module will IRM protect the information by communicating with the IRM server and replace the plain document in response with an IRM protected document. In some embodiments, while performing the above steps, the HTTP Protector module makes sure that the response size in the header is also updated with the new response size. In some embodiments, after that, it sends the response to the end user.

The techniques and mechanisms of the present disclosure thus offers a zero cost and zero effort solution to IRM protect the sensitive information downloaded from an application, as this does not require any changes to the application.

The disclosure has been described with reference to the accompanying embodiments which do not limit the scope and ambit of the disclosure. Throughout this specification, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of files, acts, materials, devices, articles or the like that has been included in this specification is solely for providing a context for the disclosure. It is not to be taken as an admission that any or all of these matters form a part of the prior art base or were common general knowledge in the field relevant to the disclosure as it existed anywhere before the priority date of this application. While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

FIG. 4 describes a method 400 for automatically protecting the sensitive information using Information Rights Management (IRM) when downloaded or extracted as document from enterprise applications without making any change/modification in the source code of the application.

Method 400 begins with intercepting (402), via a traffic interceptor, a request for downloading information from a client device. At 404, the request is forwarded, via the traffic interceptor, to a traffic protector. At 406, the request is inspected, via the traffic protector, and metadata is extracted from the request. At 408, the request is sent back, via the traffic protector, to the traffic interceptor. At 410, the request is forwarded, via the traffic interceptor, for a response to an enterprise application running on an application server. At 412, the requested information is sent, via the enterprise application, in a response to the traffic interceptor. At 414, the response is forwarded, via the traffic interceptor, to the traffic protector. At 416, the response is inspected, via the traffic protector, and sensitive information is extracted. At 418, the sensitive information is protected, via the traffic protector, using an encryption key. At 420, the sensitive information is replaced in the response with the IRM protected version of the sensitive information. At 422, the response with IRM protected sensitive information is forwarded to the traffic interceptor. Last, at 424, the response with the IRM protected information is sent to the client device.

Figure 5:
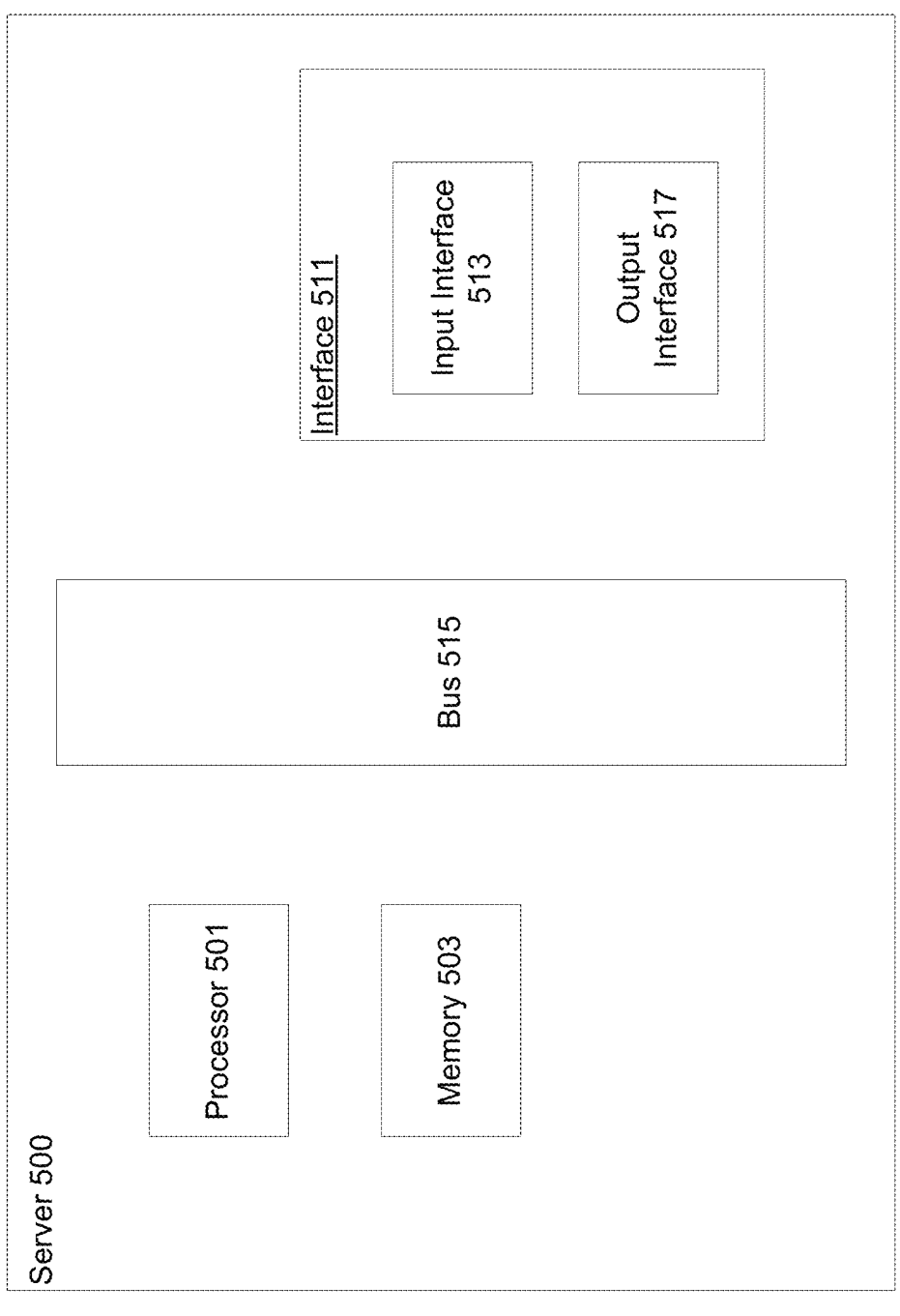
FIG. 5 shows one example of a computer system, in accordance with embodiments of the present disclosure.

With reference to FIG. 5, shown is a particular example of computer system capable of implementing various processes described in the present disclosure. For instance, the system 500 can be used to provide computation analysis according to various embodiments described above. According to particular example embodiments, a system 500 suitable for implementing particular embodiments of the present disclosure includes a processor 501, a memory 503, an interface 511, and a bus 515 (e.g., a PCI bus). The interface 511 may include separate input interface 513 and output interface 517, or may be a unified interface supporting both operations. When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for automatically protecting documents using Information Rights Management (IRM), the method comprising:

intercepting, via a traffic interceptor, a request for downloading information from a client device;

forwarding, via the traffic interceptor, the request to a traffic protector;

inspecting, via the traffic protector, the request and extracting metadata comprising a URL pattern and request parameters from the request to determine, before the response is generated by the enterprise application, whether the response will contain sensitive information requiring IRM protection;

sending, via the traffic protector, the request back to the traffic interceptor;

forwarding, via the traffic interceptor, the request for the response to an enterprise application running on an application server;

sending, via the enterprise application, the requested information in a response to the traffic interceptor;

forwarding, via the traffic interceptor, the response to the traffic protector;

inspecting, via the traffic protector, the response and extracting sensitive information, protecting, via the traffic protector, the sensitive information using an encryption key;

replacing the sensitive information in the response with the IRM protected version of the sensitive information, wherein the IRM protected version is generated by applying specific permissions based on the user identity and the type of information requested;

forwarding the response with IRM protected sensitive information to the traffic interceptor; and sending the response with the IRM protected information to the client device.

2. The method of claim 1, wherein protecting the sensitive information includes determining what permissions are to be applied to the protected sensitive information.

3. The method of claim 1, wherein the encryption key is fetched from an IRM server.

4. The method of claim 1, wherein the sensitive information is in a document downloaded from the enterprise application running an HTTP protocol.

5. The method of claim 1, wherein the traffic interceptor is installed between the application server running the enterprise application and the client device in order to intercept HTTP requests and modify HTTP responses between the application server and client device.

6. The method of claim 1, wherein the traffic protector is connected to the traffic interceptor in order to inspect and detect sensitive information in an HTTP response forwarded by the traffic interceptor.

7. The method of claim 1, wherein the IRM server is connected to the traffic protector.

8. A system for automatically protecting documents using Information Rights Management (IRM), the system comprising:

a processor; and memory, the memory storing instructions to execute a method, the method comprising:

intercepting, via a traffic interceptor, a request for downloading information from a client device;

forwarding, via the traffic interceptor, the request to a traffic protector;

inspecting, via the traffic protector, the request and extracting metadata comprising a URL pattern and request parameters from the request to determine, before the response is generated by the enterprise application, whether the response will contain sensitive information requiring IRM protection;

sending, via the traffic protector, the request back to the traffic interceptor;

forwarding, via the traffic interceptor, the request for the response to an enterprise application running on an application server;

sending, via the enterprise application, the requested information in a response to the traffic interceptor;

forwarding, via the traffic interceptor, the response to the traffic protector;

inspecting, via the traffic protector, the response and extracting sensitive information, protecting, via the traffic protector, the sensitive information using an encryption key;

replacing the sensitive information in the response with the IRM protected version of the sensitive information;

forwarding the response with IRM protected sensitive information to the traffic interceptor; and sending the response with the IRM protected information to the client device.

9. The system of claim 8, wherein protecting the sensitive information includes determining what permissions are to be applied to the protected sensitive information.

10. The system of claim 8, wherein the encryption key is fetched from an IRM server.

11. The system of claim 8, wherein the sensitive information is in a document downloaded from an enterprise application running an HTTP protocol.

12. The system of claim 8, wherein the traffic interceptor is installed between an application server running the enterprise application and a client device in order to intercept HTTP requests and modify HTTP responses between the application server and client device.

13. The system of claim 8, wherein the traffic protector is connected to the traffic interceptor in order to inspect and detect sensitive information in an HTTP response forwarded by the traffic interceptor.

14. The system of claim 8, wherein the IRM server is connected to the traffic protector.

15. A non-transitory computer readable medium storing instructions to cause a processor to execute a method, the method comprising:

intercepting, via a traffic interceptor, a request for downloading information from a client device;

forwarding, via the traffic interceptor, the request to a traffic protector;

inspecting, via the traffic protector, the request and extracting metadata comprising a URL pattern and request parameters from the request to determine, before the response is generated by the enterprise application, whether the response will contain sensitive information requiring IRM protection;

sending, via the traffic protector, the request back to the traffic interceptor;

forwarding, via the traffic interceptor, the request for the response to an enterprise application running on an application server;

sending, via the enterprise application, the requested information in a response to the traffic interceptor;

forwarding, via the traffic interceptor, the response to the traffic protector;

inspecting, via the traffic protector, the response and extracting sensitive information, protecting, via the traffic protector, the sensitive information using an encryption key;

replacing the sensitive information in the response with the IRM protected version of the sensitive information;

forwarding the response with IRM protected sensitive information to the traffic interceptor; and sending the response with the IRM protected information to the client device.

16. The non-transitory computer readable medium of claim 15, wherein protecting the sensitive information includes determining what permissions are to be applied to the protected sensitive information.

17. The non-transitory computer readable medium of claim 15, wherein the encryption key is fetched from an IRM server.

18. The non-transitory computer readable medium of claim 15, wherein the sensitive information is in a document downloaded from the enterprise application running an HTTP protocol.

19. The non-transitory computer readable medium of claim 15, wherein the traffic interceptor is installed between the application server running the enterprise application and the client device in order to intercept HTTP requests and modify HTTP responses between the application server and client device.

20. The non-transitory computer readable medium of claim 15, wherein the traffic protector is connected to the traffic interceptor in order to inspect and detect sensitive information in an HTTP response forwarded by the traffic interceptor.

* * * * *